United States Patent [19]

Kolle et al.

[11] 4,405,855
[45] Sep. 20, 1983

[54] METHOD AND APPARATUS FOR REGULATING THE TEMPERATURE OF A HEATING ELEMENT IN A WATER HEATER

[75] Inventors: Kjell Kolle, Arnes; Svein Johannessen, Oslo, both of Norway

[73] Assignee: FerroFil A/S, Norway

[21] Appl. No.: 224,526

[22] PCT Filed: Apr. 14, 1980

[86] PCT No.: PCT/N080/00013
§ 371 Date: Dec. 20, 1980
§ 102(e) Date: Nov. 24, 1980

[87] PCT Pub. No.: WO80/02352
PCT Pub. Date: Oct. 30, 1980

[30] Foreign Application Priority Data

Apr. 20, 1979 [NO] Norway ................. 791325

[51] Int. Cl.$^3$ ............................................. H05B 1/02
[52] U.S. Cl. .................................... 219/501; 219/494; 219/507; 219/328; 219/331
[58] Field of Search ............... 219/494, 497, 501, 508, 219/327, 328, 331; 165/169

[56] References Cited

U.S. PATENT DOCUMENTS 3,845,274 10/1974 Krenke et al. .................. 219/494
4,010,412 3/1977 Forman .......................... 219/497
4,192,992 3/1980 Stevens et al. .................. 219/328

FOREIGN PATENT DOCUMENTS 1426399 2/1976 United Kingdom ............ 219/328

*Primary Examiner*—M. H. Paschall
*Attorney, Agent, or Firm*—Kenway & Jenney

[57] ABSTRACT

In a method and an apparatus for regulating the power which is supplied to a heating element (2) in a water heater (1), preferably a reservoir water heater containing water which is to be heated to a certain temperature, the power which is supplied to the heating element for heating the water, is regulated not only in dependence on the temperature of the water (15), but also in dependence on the temperature of the heating element (2, 4), so that the temperature of the element is kept below a predetermined critical value. The temperature of the heating element is measured directly and/or indirectly, and when the temperature of the element is below the critical value and the temperature of the water in the water heater is below the rated value, maximum power can be supplied to the heating element. When the temperature of the element has reached the critical value, but the temperature of the water in the water heater is still below the rated value, the power is regulated so as to keep the temperature of the heating element below the critical value and to minimize the heating period.

6 Claims, 5 Drawing Figures

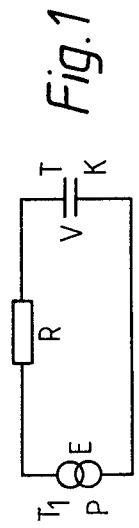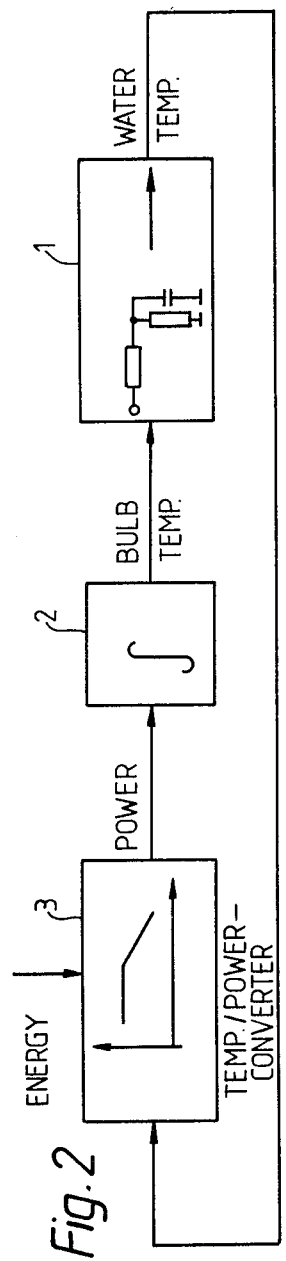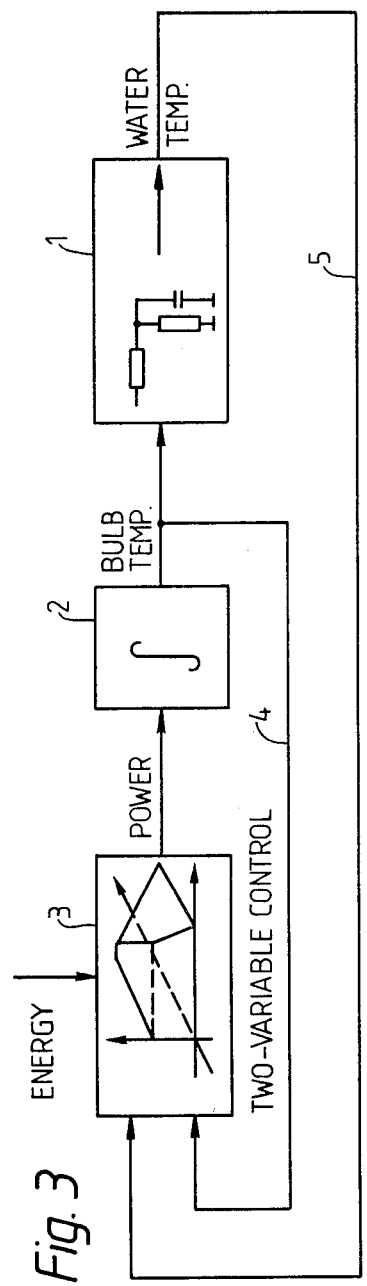

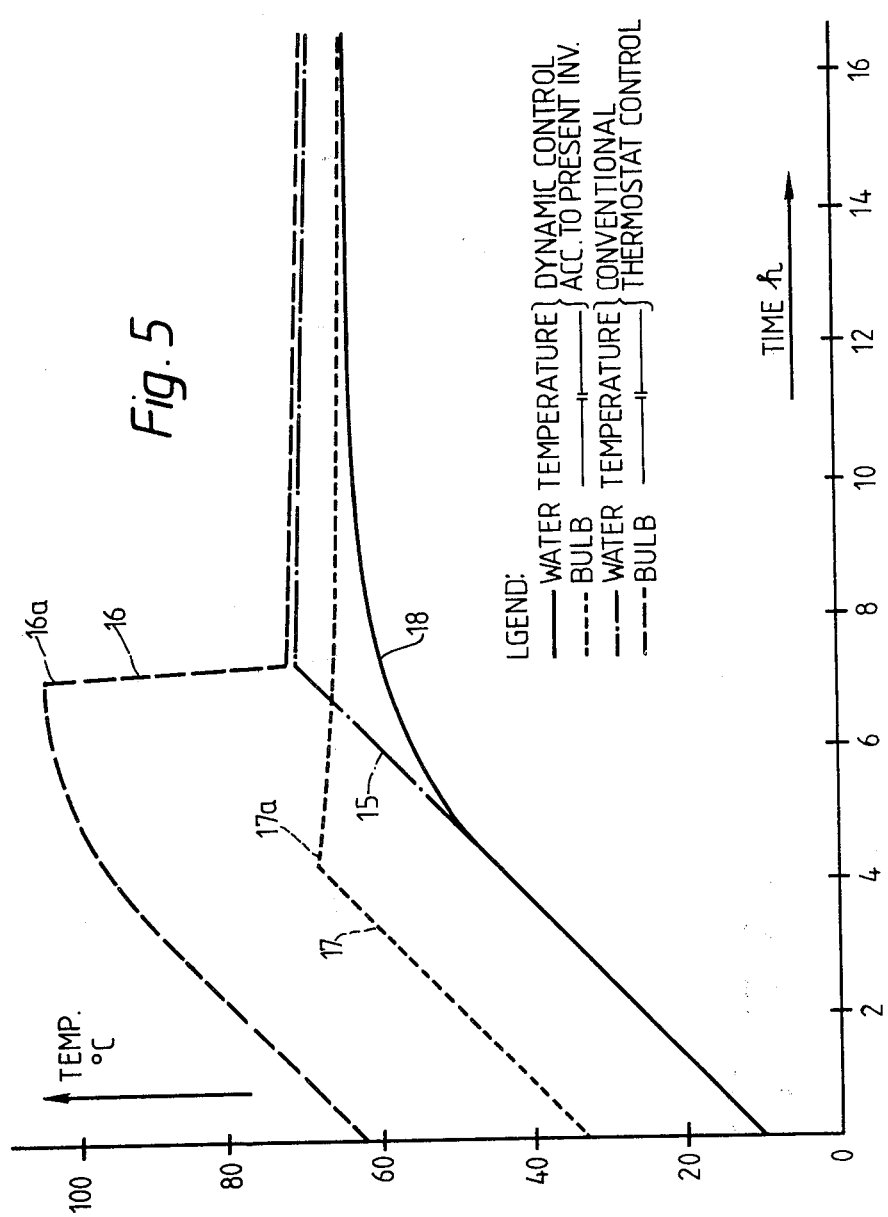

METHOD AND APPARATUS FOR REGULATING THE TEMPERATURE OF A HEATING ELEMENT IN A WATER HEATER

The present invention relates to a method for regulating the temperature of a heating element in a water heater, preferably a reservoir water heater containing water which is to be heated to a certain temperature, the supplied power being regulated as a function of the temperature of the water.

The invention also relates to an apparatus for carrying out the method.

It is known that although modern water heaters usually have a lifetime of approximately 20 years at normal temperatures and pressures, it is unrealistic to envisage an average lifetime of the heating element of more than approximately 5 years. With today's prices on craftmanship the cost of replacements of elements may rapidly amount to more than what a new water heater would cost. It is also known that it is the element proper which is most influenced in an unfavourable direction when the water in the heater deviates from the normal, i.e. becomes more acid, more calcareous, etc.

Further, it is known that all chemical processes are speeded up when the temperature increases. This is also true for the phenomenons which are particularly related to the heating element, i.e. corrosion, calcareous deposits and formation of fissures.

From DE-AS No. 1 565 134 there is known a through-flow heater, wherein the heating elements are switched on and off by current gates. The gates are trigged indirectly by a direct voltage which is proportional to the temperature of the water, a large power being supplied at low temperature of the water, whereas reduced power being supplied at high water temperature. The main purpose of this known power control arrangement is to bring the temperature of the water to a desired value irrespective of the maximum temperature to which the heating element will be subjected during maximum load. Thus, this publication does not give instructions for how the lifetime of the heating elements in a water heater can be increased by simple expediences, i.e. no instructions are given for how the effects of the processes which shorten the lifetime of the heating element, can be reduced to a minimum. Further, DE-AS No. 1 565 134 only deals with a through-flow heating in which the heating element during operation is continuously in contact with a flow of fresh water, a fact which involves that no local boiling phenomenons will occur in the area of the heating element. Such conditions will, however, often occur in reservoir water heaters which are controlled by conventional "on-off" thermostats which only senses whether the water temperature is above or below the rated value.

It is true that from DE-AS No. 1 565 134 there is known stepless regulation of power by antiparallel connection of thyristors, but such a regulation is not suggested to be used in a control system for reducing the maximum temperature of the heating element so as to reduce the development of calcareous deposits and fissure formations which aid in reducing the lifetime of the heating element, let alone for making the heating time of the water under these circumstances as short as possible.

From SCR Manual, 4th Edition 1967, General Electric Company, page 278–281 there are known systems for precision temperature control, but no instructions are given therein for how such control systems must be modified and interconnected to give a solution to the task underlying the present invention.

Thus, an object of the present invention is to give instructions for a dynamic control of the power which is supplied to a reservoir water heater, the dynamic control being designed so as to keep the temperature of the heating element below a certain limit for minimizing the effects of the processes which shorten the lifetime of the heating element, the supplied power nevertheless being kept at such a high value that the heating time is reduced to a minimum.

As stated in the preamble the present invention relates to a method for regulating the power which is supplied to the heating element in a water heater, preferably a reservoir water heater holding water which is to be heated to a given temperature. It is previously known to regulate the supplied power as a function of the temperature of the water. However, what is characteristic for the present invention is that the power which is supplied to the heating element for heating the water, is regulated not only in relation to the temperature of the water, but also in relation to the temperature of the heating element, the temperature of the heating element being measured directly and/or indirectly.

More specifically, the present invention suggests a combination of the two measurements, which on the one side is to the effect of measuring the water temperature itself and on the other side is to the effect of measuring the temperature of the heating element, the latter temperature being measured directly and/or indirectly.

The critical temperature of the heating element may be calculated indirectly on the basis of measurements taken of the water temperature, the relation between the temperature of the heating element and the temperature of the water being given by a factor which is determined by the supplied power and the thermal resistance between the heating element and the water in the heater.

Alternatively, the critical temperature of the heating element may be calculated by measuring both the water temperature and the temperature of the heating element, the supplied power being reduced when the critical temperature of the heating element is exceeded, and the degree of reduction being determined by the difference between the temperature of the element and the temperature of the water.

The power regulation may be effected either by phase control of the alternating voltage supplied to the heating element, or by so-called block control, i.e. a certain integral member of alternating current periods being gated through a gate element at certain intervals.

An apparatus for carrying out the method according to the invention comprises a first means which regulates the power which is supplied to the heating element, as a function of the temperature of the water, and is characterized in that the apparatus in addition to the first means which regulates the supplied power as a function of the temperature of the water, also comprises a control means which regulates the supplied power to the heating element in dependence on the temperature thereof, the control means sensing the temperature of the heating element directly and/or indirectly, and the first means and the control means comprising or being connected to devices for controlling the power in dependence on both the water temperature and the temperature of the element, so that:

(a) when the temperature of the element is below a certain critical value and the temperature of the water in the water heater is below the rated value, there is supplied maximum power to the heating element, (b) that when the temperature of the element has reached the critical value but the temperature of the water in the water heater is below the rated value, there is supplied less power than the maximum power to the element for further heating of the water, so that the temperature of the element is kept below the critical value, and (c) when the water reaches the rated value, no power is supplied.

In the following the invention will be described further, reference being had to the drawing, which illustrates non-limiting embodiments of the invention.

FIG. 1 is an equivalence diagram of the circuit in which a heating element of a water heater is comprised.

FIG. 2 is a simplified block diagram of dynamic power control based on water temperature.

FIG. 3 is a simplified block diagram of dynamic power control based on water temperature and element temperature.

FIG. 5 is a graphic representation of the temperature/time-relation of the water and the heating element in a prior art control system and a control system according to the present invention.

Figure 4:
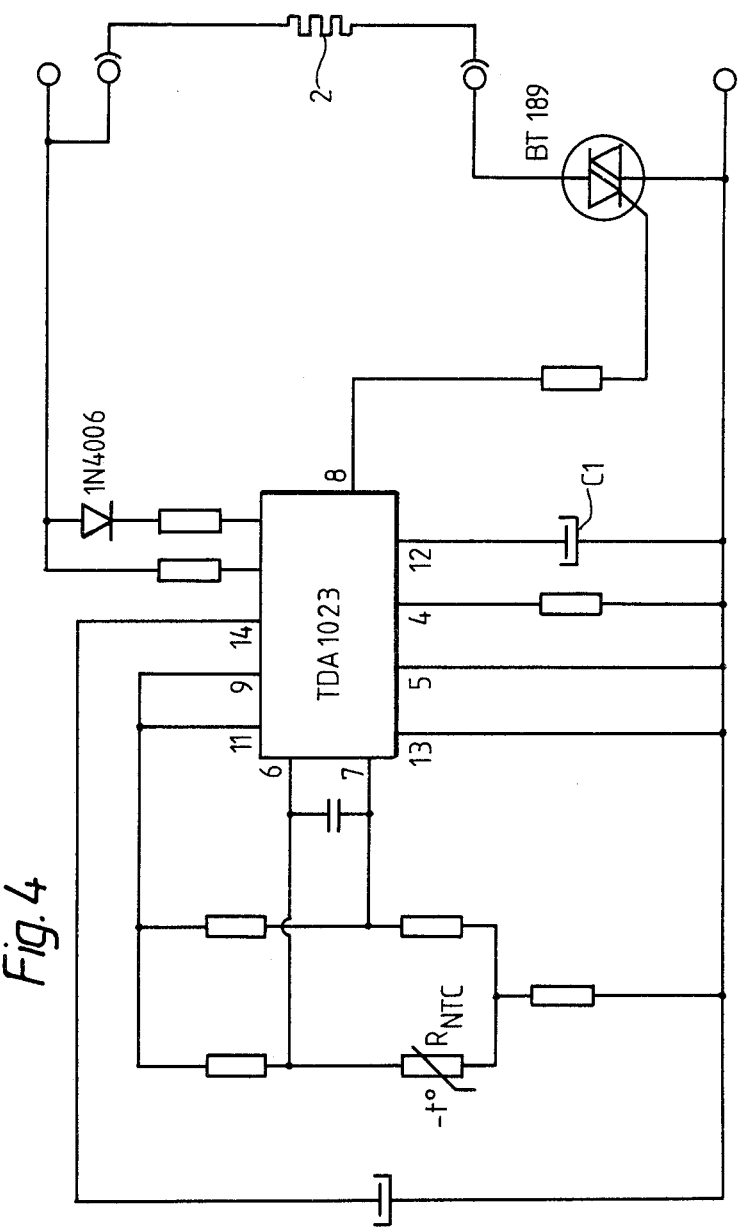
FIG. 4 is a more detailed circuit diagram of dynamic power control.

The system in which an electric heating element E in a water heater V is included, has an equivalence diagram as illustrated in FIG. 1. The electric power P (measured in Watts) is transferred from element E to the water V which has a temperature T and a thermal capacity K. For the heat to be transferred to the water, the element must have a higher temperature $T_1$. The heating element has a thermal resistance R which is given by the design of the element, i.e. geometry, material etc., and which expresses the relation between the temperature difference to the water and developed power in the element. The thermal resistance may be regarded as approximately constant in the temperature ranges which are practically applicable in connection with water heaters.

From the above it follows that the temperature of the element $T_1$ is given as the temperature in the water T plus the thermal resistance times the power, or expressed mathematically:

$$T_1 = T + P \cdot R. \tag{I}$$

As mentioned above all chemical processes develops more rapidly when the temperature increases. This is also the case for the phenomenons which aids in reducing the lifetime of the heating element, i.e. corrosion, calcareous deposits and formations of fissures. Thus, an object of the present invention is to keep the temperature of the element surface as low as this can be done in practice, and taking the above equation (I) as a starting point a discussion will be given of measures which hitherto have been taken in order to increase the lifetime of the heating element.

To reduce the maximum temperature of the element one has previously suggested (a) to reduce the maximum water temperature $T_M$. Such a maximum temperature has for example by NEMKO, been decided to be 70° C., but it is to be understood that this temperature may vary from country to country, depending on the institutions which determines the actual regulations.

However, it is to be understood that the maximum water temperature cannot be too low, as this means a poor utilization of the thermal capacity of the water heater.

Further, it has been suggested (b) to reduce the thermal resistance R. Since R is approximately inversely proportional to the surface of the element, the power density (the maximum power of the element divided by its surface) constitutes some sort of a measuring standard of the thermal resistance. For example, NEMKO has here given a limit of the power density, namely 5,5 W/cm².

To reduce the maximum temperature of the element, one may further (c) reduce maximum power. Also in this connection some institutions have put up certain limits, but since the heating time is inversely proportional with the power, a strong reduction of maximum power may entail unacceptable long water heating periods.

In connection with the present invention, however, it is aimed for a dynamic control of the power which is supplied to the heating element. More specifically, the power which is supplied to the heating element for heating the water, is regulated not only in dependence on the water temperature, but also in relation to the temperature of the heating element proper, the supplied power being reduced when the temperature of the heating element has reached a certain critical value.

But even if the temperature of the heating element is kept below a certain critical value, the control of the present invention will continue to supply power to the heating element for further heating of the water towards the rated temperature thereof, the power then being adjusted so as to keep the power supply at a level which minimizes the heating period.

Taking the above equation (I) as an outgoing point the critical temperature of the heating element may be calculated on the basis of measurements taken of the water temperature, since the relation between the temperature of the heating element and of the water is given by the abovementioned equation.

On the assumption that the temperature of the heating element should be kept below the maximum temperature $T_2$ and in case the temperature T of the water is measured, the maximum power at this temperature may be expressed as:

$$P = (T_2 - T)/R. \tag{II}$$

If the maximum power P is limited to the rated power $P_m$ of the element, the above equation will give a critical water temperature $T_k$ at $$T_k = T_2 - P_m \cdot R. \tag{III}$$

To obtain the best possible utilization of the heating element without exceeding the temperature $T_2$ thereof, the power will in accordance with the invention be reduced when the corresponding water temperature exceeds $T_k$. The further heating of the water will then take place at a lower mean power until the temperature of the water has reached the rated temperature, but during this last heating phase the temperature of the heating element will in all essentials be below the critical temperature due to the reduced power.

The regulation of the power which is supplied to the heating element can generally be summarized in three main phases, namely (a) When the element temperature ($T_1$) is below the critical value ($T_1 < T_2 = T_k + P_m \cdot R$) and the temperature of the water is below its rated value, maximum power will be supplied to the heating element.

(b) When the element temperature ($T_1$) has reached the area of the critical value ($T_1 = T_2 = T_k + P_m \cdot R$), but the water temperature is below the rated value, reduced power ($P < P_m$) will be supplied to the heating element for further heating of the water. The power will not be larger than keeping the element temperature below the critical value, but to minimize the heating period it will be as large as the critical value allows for. Since the water temperature during the further heating of the water steadily increases towards the rated water temperature, the supply of power must be further reduced towards zero, so as to still keep the temperature of the heating element below the critical value.

(c) When the temperature of the water has reached the rated value, no power will be supplied to the heating element.

Reduced power may be implemented in a series of various manners. For example, the power may be regulated by phase control of the supplied alternating voltage to the heating element, the firing angle thereof being increased the closer the water temperature comes to the rated temperature.

If desired, the power regulation may be implemented by means of so-called block control, i.e. a certain integral number of alternating voltage periods are gated through a valve unit at certain intervals. Upon gate enabling the power may be the maximum, but due to the small time intervals in which the power is effective, the temperature of the heating element will not reach above the critical value.

As mentioned, a dynamic control of the power for reducing the maximum temperature of the element whilst simultaneously minimizing the heating time during these conditions, may be carried out by measuring the water temperature alone and by calculations based on the water temperature and known units, such as the rated power of the element, thermal resistance and the thermal capacity of the water heater.

However, it is to be understood that the dynamic control of the power may also be conducted on the basis of temperature measurements taken on the inner surface of the element together with the measurement of the water temperatures. These measurements together then decide the supplied power either according to a permanently established or a variable programme.

Because most of the temperature dependent conditions increase exponentially with the temperature, it is fair to assume that the aging of the heating element does the same. This means that if the usual maximum temperature of the element is reduced by $\Delta T$, the lifetime of the element will so to say be doubled. Correspondingly, the lifetime may be increased four times if the temperature is reduced by $2\Delta T$. As mentioned earlier the lifetime of the water heater is estimated to be approximately four times that of the heating element, and if the usually permitted temperature of the element may be kept below this lower temperature the element will have approximately the same lifetime as the water heater.

In FIG. 2 there is illustrated a simplified block diagram of a dynamic power control which is based on measurement of the water temperature alone. Here, the water heater is indicated as the block 1 and presented as an equivalent RC-network receiving energy from the heating element or bulb 2, which in turn receives power via a control unit 3.

The temperature of the water in the water heater 1 is measured and converted to a theoretic power according to a given pattern which is determined by the control unit 3. This theoretic power corresponds to the real power which is to be supplied to the heating element (bulb) for the heating thereof and transfer of heat to the water. As the water temperature increases due to the supplied electric power also the temperature of the heating element will increase. At a certain high water temperature corresponding to a critical temperature for the heating element the supplied power will be reduced for thereby keeping the temperature of the element below the critical temperature.

In FIG. 3 which is a block diagram of a dynamic power control based on both water temperature and element temperature, 1 also here designates the water heater, 2 the element (bulb) and 3 a control unit of somewhat different design than the control unit discussed in connection with FIG. 2. In the block diagram of FIG. 3 the temperature of the element 2 is measured by an inner loop 4, whereas the temperature of the water in the water heater 1 is measured by an outer loop 5. Together the two temperatures will in accordance with a predetermined relation give a theoretic power which via the control unit 3 is converted to real electric power supplied to the element 2. The power, which is supplied to the element 2, is transferred to the water in the water heater for the heating thereof, and by continuous control of the temperature of the element and of the water in the water heater there is achieved a rapid as possible heating of the water even if the temperature of the heating element is kept below a certain critical value.

Both in the system illustrated in FIG. 2 and in the system illustrated in FIG. 3 the desired temperatures may be measured by means of for example temperature sensitive resistors or semiconductor sensors or other components which can easily be adapted to other electronic circuits. The main case is to utilize temperature sensitive elements which produce an electric voltage which varies with the temperature.

Desired functions of one or two variables as this is indicated in the diagrams of the blocks 3 of FIGS. 2 and 3, can be implemented electrically with an arbitrary accuracy by means of amplifiers, resistors and unlinear elements, such as diodes and transistors.

The control of the power supplied to the heating element may for example be done by thyristors or triacks or available electronic circuits comprising either discrete or compound integrated components. The power may both be phase controlled, i.e. a certain part of each alternating voltage period are let through to the heating element, or be block controlled, wherein a certain integral number of voltage periods are let through to the heating element and another number is retained depending on the value of the measured temperatures. The bulk of the water in the water heater will smoothen the power blocks when block control is used.

In FIG. 4 there is illustrated a circuit diagram of a control unit for dynamic power control based on water temperature only. The circuit TDA 1023 is especially designed for control of power in "blocks". The duration of these blocks are determined by a capacitor $C_1$ which in the embodiment is chosen to 47 μF, but may be adapted to national or international regulations, for example from CENELEC. The circuits are controlled via voltage levels on pins 6 and 7 with a linear range of 0,4 V when pin 5 is earthed. During normal operation the circuit may operate as follows:

(a) If the temperature of the water in the water heater is less than a certain temperature, for example 55° C., there is supplied full power to the heating element (bulb) 2 via the triack BT 189.

(b) If the temperature is larger than 55° C. and less than 70° C., the power which is supplied to the heating element 2 will be less than the maximum. Besides, the power will be reduced monotonously towards zero when the temperature rises towards 70° C. or to another temperature.

(c) If the temperature of the water is higher than 70° C. or higher than another predetermined temperature, there will be supplied no power before the temperature in the water heater sinks to a lower value.

In FIG. 5 there is by means of graphs illustrated the temperature/time-relation of water and bulb, respectively, in a prior art thermostat control system and a control system according to the present invention. It should be noted that in a conventional thermostat control system, in which the power to the bulb remains switched on as long as the temperature of the water — indicated by dash-dotted line 15 in FIG. 5—is below the rated value, the temperature of the bulb—indicated by dashed line 16 in FIG. 5—will increase far beyond the temperature. In many cases, the temperature of the bulb will then increase beyond 100° C. and detrimental effects such as local boiling of the water will occur in the area of the overheated bulb. This condition is unfavourable to the bulb and aids considerably in the reduction of its lifetime.

According to the present invention the power which is supplied to the heating element or bulb is regulated not only in dependence on the temperature of the water to be heated, but also in dependence on the temperature of the heating element itself, so as to keep the temperature of the heating element below a predetermined critical value. In such a system the temperature of the bulb—indicated by the dotted line 17 in FIG. 5, follows the temperature of the water to be heated more closely, the graph illustrating the temperature of the water to be heated for the system according to the present invention, being shown in solid line and designated by 18.

The main difference between the prior art system illustrated by the bulb temperature line 16 and the present system illustrated by the bulb temperature line 17, is the difference in peak temperature. In the conventional thermostat system the peak bulb temperature 16a will be more than 30° C. above the rated water temperature and can thus induce local boiling around the bulb, whereas the present system offers a peak bulb temperature of only a few °C. above the rated water temperature. As previously explained, the heating of the water in the water heater will according to the present control system, be carried out with a view of keeping the heating time as short as possible.

It should further be noted that the graphs illustrated in FIG. 5 are representative for systems in which the heating of the water in a water heater is started at a temperature far below the rated water temperature. However, also when the water heater is operating at idle, i.e. when only power to compensate for heat losses through the heater walls is supplied to the bulb, similar bulb peak values will occur, i.e. high peak values far above rated water temperature in prior art systems, but low peak values close to the rated water temperature in the system according to the present invention.

It is to be understood that the dynamic control of the power, which serves to reduce the maximum temperature of the heating element at the same time as the heating period under these conditions is kept to a minimum, may be implemented in other manners than what has been indicated through the above described embodiments. As mentioned above the supply of the power may be regulated by phase control or block control, but it is to be understood that also other step control circuits or stepless controls may be contemplated.

We claim:

1. Method for regulating the power which is supplied to a heating element in a water heater, preferably a reservoir water heater containing water which is to be heated to a certain temperature, the supplied power being regulated as a function of the temperature of the water, characterized in that the power which is supplied to the heating element for heating the water, is regulated not only in dependence on the temperature of the water, but also in dependence on the temperature of the heating element, the temperature of the heating element being measured directly and/or indirectly so that (a) when the temperature of the element is below a certain critical value and the temperature of the water in the water heater is below the rated value, maximum power is supplied to the heating element, (b) when the temperature of the element has reached the critical value, but the temperature of the water in the water heater is below the rated value, less power than the maximum power is supplied to the element for further heating of the water, so that the temperature of the element is kept below the critical value, and (c) when the water temperature reaches the rated value, no power is supplied the critical temperature of the heating element being sensed indirectly by measuring the water temperature, the relation between the temperature of the heating element ($T_1$) and the water ($T_v$) being given by $$T_1 = T_v + P \cdot R$$

wherein T denotes the water temperature, P supplied power and R thermal resistance between the heating element and the water in the heater.

2. Method as stated in claim 1, characterized in that the power is regulated as known per se by phase control of supplied alternating voltage to the heating element.

3. Method as claimed in claim 1, characterized in that the power regulation is effected through supply of power in blocks, i.e. a certain number of alternating voltage periods are let through to the heating element at certain intervals.

4. Apparatus for carrying out a method for regulating the power which is supplied to the heating element in a water heater, preferably a reservoir water heater holding water which is to be heated to a certain temperature comprising a first means which regulates the supplied power as a function of the temperature of the water, characterized in that the apparatus in addition to the first means which regulates the supplied power as a function of the temperature of the water, also comprises a control means which regulates the supplied power to the heating element in dependence on the temperature thereof, the control means sensing the temperature of the heating element directly and/or indirectly, and the first means and the control means comprising or being connected to devices for controlling the power in dependence on both the water temperature and the temperature of the element, so that:

(a) when the temperature of the element is below a certain critical value and the temperature of the water in the water heater is below the rated value, there is supplied maximum power to the heating element, (b) that when the temperature of the element has reached the critical value but the temperature of the water in the water heater is below the rated value, there is supplied less power than the maximum power to the element for further heating of the water, so that the temperature of the element is kept below the critical value, and the control means on the one side being connected to a device for measuring the water temperature ($T_v$) and on the other side compares the water temperature with a magnitude given by $$T_k - R \cdot P_m$$

wherein $T_k$ denotes the critical temperature of the element, R thermal resistance and $P_m$ maximum power.

5. Apparatus as claimed in claim 4, characterized in that the apparatus further comprises a device for phase control as known per se of the supplied power.

6. Apparatus as claimed in claim 4, characterized in that the apparatus further comprises a device for power regulating by block control, i.e. by letting through a certain number of alternating voltage periods to the heating element at certain intervals.

* * * * *